United States Patent
Jones et al.

(10) Patent No.: US 11,365,847 B2
(45) Date of Patent: Jun. 21, 2022

(54) MOTION ACTIVATED WAREHOUSE SAFETY LIGHT

(71) Applicant: Keystone Sales Group, Inc., Louisville, CO (US)

(72) Inventors: Parker Jones, Louisville, CO (US); Brent Jones, Louisville, CO (US); Stephen Jones, Louisville, CO (US)

(73) Assignee: Keystone Sales Group, Inc., Westminster, CO (US)

( * ) Notice: Subject to any disclaimer, the term of this patent is extended or adjusted under 35 U.S.C. 154(b) by 0 days.

(21) Appl. No.: 17/230,667

(22) Filed: Apr. 14, 2021

(65) Prior Publication Data
US 2021/0332945 A1 Oct. 28, 2021

Related U.S. Application Data

(60) Provisional application No. 63/013,828, filed on Apr. 22, 2020.

(51) Int. Cl.
*F16P 3/14* (2006.01)
*H05B 47/115* (2020.01)
*B66F 17/00* (2006.01)

(52) U.S. Cl.
CPC ............ *F16P 3/144* (2013.01); *B66F 17/003* (2013.01); *H05B 47/115* (2020.01)

(58) Field of Classification Search
CPC .... F16P 3/144; F16P 3/148; F16P 3/12; F16P 3/00; H05B 47/115; H05B 47/20; H05B 47/23; H05B 47/24; H05B 47/25; H05B 47/26; H05B 47/28
See application file for complete search history.

(56) References Cited

U.S. PATENT DOCUMENTS

| | | | | |
|---|---|---|---|---|
| 5,572,202 A | * | 11/1996 | Regel | G08G 1/07 340/944 |
| RE36,930 E | * | 10/2000 | Houten | G08G 1/095 340/925 |
| 6,384,742 B1 | * | 5/2002 | Harrison | E01F 9/559 340/925 |
| 6,650,242 B2 | * | 11/2003 | Clerk | F16P 3/144 340/902 |
| 7,688,222 B2 | * | 3/2010 | Peddie | G08G 1/096783 116/63 P |
| 8,049,639 B2 | * | 11/2011 | Sibalich | F21V 23/0442 340/693.11 |
| 8,144,000 B2 | | 3/2012 | Darby, Jr. et al. | |
| 8,686,874 B2 | * | 4/2014 | Ryan | G01R 33/10 340/909 |
| 8,730,035 B2 | * | 5/2014 | Nagashima | H05B 47/115 340/539.22 |

(Continued)

*Primary Examiner* — Hoi C Lau
(74) *Attorney, Agent, or Firm* — Leydig, Voit & Mayer, Ltd.

(57) ABSTRACT

Provided herein are LED warning lights and related methods for detecting oncoming traffic around corners, including in a warehouse. The warning lights have: a LED light module and an external motion sensor operably connected to the LED light module. The device is self-contained with respect to power, communication and alerts in that no other components are required, so that the warning lights are portable and readily positioned as desired and are immediately operable.

19 Claims, 5 Drawing Sheets

(56) References Cited

U.S. PATENT DOCUMENTS

| | | | | |
|---|---|---|---|---|
| 9,007,235 | B2* | 4/2015 | Ryan | G08B 13/19652 |
| | | | | 340/909 |
| 9,336,666 | B2* | 5/2016 | Ryan | G01R 33/10 |
| 9,955,551 | B2* | 4/2018 | Spero | H05B 45/20 |
| 10,242,561 | B1* | 3/2019 | Davies | G08B 13/19 |
| 10,326,921 | B2* | 6/2019 | Chien | G01J 5/025 |
| 10,755,537 | B1* | 8/2020 | Palmer | G08B 3/10 |
| 10,896,589 | B2* | 1/2021 | Carlson | G06F 1/163 |
| 11,101,686 | B1* | 8/2021 | Recker | H05B 47/19 |
| 2007/0013557 | A1* | 1/2007 | Wang | H05B 45/30 |
| | | | | 340/945 |
| 2007/0024433 | A1* | 2/2007 | Garner | G09B 25/00 |
| | | | | 340/901 |
| 2011/0148309 | A1* | 6/2011 | Reid | H05B 47/175 |
| | | | | 315/159 |
| 2011/0163222 | A1* | 7/2011 | Moser | F24S 50/20 |
| | | | | 250/203.4 |
| 2014/0028473 | A1* | 1/2014 | Ryan | G01R 33/10 |
| | | | | 340/907 |
| 2015/0159846 | A1* | 6/2015 | Hollinger | F21V 33/008 |
| | | | | 362/183 |
| 2015/0194040 | A1* | 7/2015 | Fiedler | H04W 4/70 |
| | | | | 340/870.09 |
| 2018/0033273 | A1* | 2/2018 | Siminoff | G08B 15/008 |
| 2018/0259171 | A1* | 9/2018 | Pharr | F21V 15/01 |
| 2018/0293863 | A1* | 10/2018 | Tavares | G08B 15/00 |
| 2018/0332204 | A1* | 11/2018 | Chien | F21V 23/0435 |
| 2019/0230324 | A1* | 7/2019 | Chien | F21V 21/14 |
| 2020/0384287 | A1* | 12/2020 | Hetz | A61B 5/0077 |
| 2021/0162912 | A1* | 6/2021 | Spero | F21K 9/23 |
| 2021/0332945 | A1* | 10/2021 | Jones | H05B 47/13 |

* cited by examiner

MOTION ACTIVATED WAREHOUSE SAFETY LIGHT

CROSS-REFERENCE TO RELATED APPLICATIONS

This application claims the benefit of U.S. Provisional Application No. 63/013,828, filed on Apr. 22, 2020, which is incorporated by reference herein in its entirety.

BACKGROUND

Provided herein is a warning light for use in visually-obstructed sight lines to warn of a potential collision. The invention is particularly well-suited for use in warehouses where there are a combination of warehouse loading/unloading/moving vehicles and individuals walking, including around corners that make approaching traffic difficult to see.

There is a need in the art for low-cost, effective and readily scalable systems to minimize risk of collision in areas that are visually obstructed, such as a warehouse setting. For example, in existing warehouses, there are often a number of potential high-traffic and visually-obstructed areas where risk of a collision between a person and moving heavy machinery is high. Conventional systems known in the art, including proximity alarms, are expensive and can be time-consuming to obtain, install and manage. For example, U.S. Pat. No. 6,650,242 "Mobile plant proximity detection and warning system" requires special transmitters, detectors and special tuning so that the detectors only detects desired signals, including transmitters that are positioned on a fork-lift. US Pat. Pub. 20070024433 "Multiple independent mode pedestrian collision avoidance warning system" is a complicated system having "multiple independent mode system circuitry" to monitor "multiple areas of pedestrian traffic conflict." U.S. Pat. No. 8,144,000 "Collision avoidance" describes electronic transmission of information to a remote site to determine if there is a potential collision, with a collision alert message provided if there is a potential collision.

From the foregoing, there is a need in the art for a simple, low-cost and self-contained system that is flexible in terms of its ability to be deployed to any of a number of locations, re-positioned, removed and replaced, as desired, including by warehouse workers, without any need for special electronics, wiring, mounting, or technical installers. The devices and methods provided herein address this need in the art by providing self-contained warning lights that can be mounted to any blind corner and that self-powers the motion sensor and lights to provide a cost-effective and reliable system for potential collision warning.

SUMMARY

Provided herein are warning light for use in visually-obstructed spaces. The warning light is a type of motion activated warning light. Built-in optical light sources, such as LEDs, provide reliable and all-directional warning light illumination. when the warning light is connected to a surface. The warning light is portable, and is readily positioned on any of a range of surfaces. For example, because warehouse shelving tends to be metallic or magnetizable, the warning lights may use magnets for straightforward mounting to surfaces without a need for any tools. Other mounting means are compatible with the invention, such as Velcro® fasteners, adhesive, tape, glue, hooks, screws and the like.

Each of the individual units, the light module and the external motion sensor can be mounted to their respective surfaces, including reversibly mounted, such as with a magnet. The two individual units can be connected to each other with a cable, thereby avoiding more complex wireless protocol components, including transmitters and receivers. The cable preferentially supplies power from the optical source-containing unit to the motion sensor and transmits a motion signal from the motion sensor to the light module for appropriate actuation of the optical sources. In this way, the power source may be batteries, and can be self-contained in the light module. The batteries may be rechargeable batteries. The batteries may be non-rechargeable, such as such as three AA batteries. The batteries may be rechargeable. The batteries power the LEDs and the motion sensor(s). In this manner, for about 5 to 20, 8-20 or about 8-12 built-in LEDs, the warning light can be reliably powered for over 2500 cycles of battery life, with each cycle corresponding to about 15 seconds of light. The LEDs have about 50,000 hours of life. An LED may be used to indicate low power and warn of time to replace or recharge.

The motion sensor(s) are configured to provide 180° detection relative to a surface on which the motion sensor(s) are mounted, including with a detection range in the 4.5 m to 5 m range (e.g., about 15 feet). In this manner, the warning light is ideal for detecting oncoming traffic around visually obstructed regions, such as around corners. An audible alarm may be connected to the device to provide both visual and audio warning of potential collision. Upon motion detection, the optical light sources and/or audible alarm may activate for a time period, such as about 15 seconds, and then turn-off. In this manner, the optical sources actuate for at least about 15 seconds upon a motion detection signal from the motion sensor Provided herein are warning lights, including for use inside a warehouse having many visually obstructed corners associated with aisles defined by shelving that come to a cross-aisle in combination with fast moving machinery. For large warehouses there may be tens to hundreds or more of high-risk areas, making it challenging to reliably reduce risk of collision in a low-cost manner. The advantage of the systems provided herein is that they are low cost and reliable, so that many can be deployed in a warehouse without complexities and potential for interference associated with systems that are wireless, especially for applications where multiple systems in close proximity are required. For example, a light module is positioned on one surface, an external motion sensor around the corner on another surface, and the light module and external motion sensor connected together by a cable. In this manner, the light module and external motion sensor are plug and play, without any concern as to properly "pairing" the two systems wirelessly or remotely monitoring them from a remote control room. Anyone can position them where desired, connect the components with a cable, and achieve reliable safety to minimize risk of collisions around a blind corner in a warehouse. Alternatively, if it is desired to maintain the warning light in a particular position, and minimize risk of unwanted movement of the warning light, the light module and motion sensor may be fastened with a fastener such as glue or adhesive that cannot be readily removed, in contrast to a magnetic fastener.

In the most basic configuration, the warning light comprises two components: a light module and an external motion sensor. The light module comprises a housing having an at least partially optically-transparent upper portion; a plurality of motion-actuated optical light sources positioned in the housing and configured to illuminate in all hemispherical directions, or at least all semi-hemispherical directions, out of the optically-transparent upper portion upon a motion-detected input; a battery source positioned in the housing; a fastener connected to or incorporated in the housing base for connecting the light module to a light module support surface. The external motion sensor is operably connected to the light module, specifically electronically connected to the light module, including by a cable. A motion sensor fastener is connected to the external motion sensor for connecting the external motion sensor to a motion sensor support surface. In this manner, the external motion sensor generates a motion-detected input, when there is movement around the external motion sensor, to actuate the optical light sources upon sensing motion. The battery source in the light module may supply power to the external motion sensor.

The plurality of motion-actuated optical light sources may comprise light emitting diodes (LEDs), so that the light module may be described as a LED light module. LEDs are preferred, as they are low cost, long lasting and robust, particularly for warehouse environments where inadvertent forces may be exerted on the warning light, such as dropping, banging or hitting. The number of LEDs is optionally between 6 and 20.

The warning light may further comprise: a cable that electrically connects the external motion sensor to the LED light module, wherein the cable conveys power to the external motion sensor from the light module battery source, and electronically connects the optical light sources to the motion detected input from the external motion sensor. The cable may have a length that is between 0.5 m and 3 m. The cable may comprise a plurality of cables, wherein at least two cables are configured to interconnect with each other to increase an effective cable length. For example, longer separation distances may be desired at high-speed locations, thereby ensuring there is sufficient time for a relatively high-speed piece of heavy equipment, such as a fork-lift, to slow down.

The warning light may further comprise a light module motion sensor operably connected to the motion-actuated optical light sources, wherein motion detection by both the light module motion sensor and the external motion sensor is required for LED actuation. This embodiment is useful for situations where light actuation is desirably confined to situations where a collision is possible because of two moving objects around a blind corner, for example, In this manner, light actuation is avoided in situations where there is only motion on one side of the corner.

The warning lights provided herein are particularly useful as a motion activated warehouse safety light. Accordingly, the warning light may be configured for use around blind corners in a warehouse. In other words, the components may be designed to mount to warehouse corners, and more specifically, to the surface materials associated with blind warehouse corners, such as shelving and the like. Similarly, cable length may be selected to accommodate warehouse applications, including maximum forklift speed and braking distance, and how the cables may be run, such as along the shelf surface or behind/beneath the shelving in a more inaccessible area where damage to the cable may be less likely. In this manner, cable clips, ties or fasteners may be included to facilitate cable positioning.

The warning light may further comprise a controller positioned in the housing to control optical light source actuation. The controller may be configured to provide: a constant actuation of the optical light sources for a minimum period of time that is between 10 seconds and 20 seconds; or an actuation frequency of the optical light sources for a flashing effect. In other words, the optical light sources may be actuated for at least 10 seconds, or at least 20 seconds, in a manner that is constant (always on) or flashing.

The warning light may further comprising an audible alarm source for generating an audible alarm upon motion detection by the motion sensor. To help distinguish systems, the frequency and/or magnitude of the audible alarm may be adjustable, such as by adjusting a frequency and/or magnitude controller.

The motion sensor may comprise a passive infrared sensor or a microwave sensor.

The warning light may comprise a first plurality of the LEDs in a horizontal alignment direction to transmit light through a side surface of the housing; and a second plurality of LEDs aligned in a vertical alignment direction to transmit light through a top surface of the housing.

The warning light is compatible with any of a range of fasteners, depending on the application of interest and, more specifically, the underlying surface type and how easily movement or removal of the light module and/or motion detector is desired. Examples include, but are not limited to, a magnet, an adhesive, a hook-and-loop fastener such as Velcro®, tape, nails, and/or screws.

The housing of the light module is preferably at least partially formed of a shock-resistant material, including a polymer, a plastic such as a polycarbonate, or combinations thereof.

Also provided herein are methods of installing or using any of the warning lights described herein. For example, a method of installing a warning light to warn an individual of an approaching object in a blind corner may include the steps of: providing any of the warning lights described herein; mounting the light module to a first surface; mounting the external motion sensor to a second surface, wherein the first and second surfaces are visually obstructed from each other; electronically connecting the light module to the external motion sensor, including by a cable; thereby installing the warning light to warn an individual of an approaching object in a blind corner.

The blind corner may be inside a warehouse or other building having aisles and rows that intersect in a manner where it is difficult to visually check for cross-traffic before entering. The external motion sensor may be configured to detect a moving object that is within about 15 feet of the external motion sensor.

The moving object may be a forklift, a pallet jack, a scissor lift, a picker or a second person. The warning light is preferably positioned to detect oncoming traffic around corners. The method may relate to an application where the individual is a person moving along an aisle associated with the first surface and the second surface is associated with another individual or is a moving object.

The mounting the light module step may comprise magnetically attaching the light module to the first surface and the mounting the external motion sensor comprises magnetically attaching the external motion sensor to the second surface.

Optionally a light module motion sensor is integrated with the light module. Alternatively, the light module sensor can be a separate component that is electronically connected to the light module.

As desired, a low battery indicator may be connected to the light module to indicate when the batteries should be changed or charged. As desired, a test button may be connected to the light module, wherein upon actuation of the test button, all optical light sources are actuated. In this manner, optical light source functionality may be checked.

DETAILED DESCRIPTION

The following examples further illustrate the invention but, of course, should not be construed as in any way limiting its scope.

"Fastener" or "fastening means" is used broadly herein to refer to a component(s) that reliably connect a light module and/or motion sensor to a surface. Examples include a magnet, an adhesive, a hook-and-loop fastener such as Velcro®, adhesive, tape, glue, mounting brackets, nails, hooks, screws and the like. Preferably, the fastener does not require any special tools and can be reversibly mounted and released from a surface, such as by a magnet that is mounted to a ferromagnetic surface (also referred herein as a "magnetizable surface").

"Shock-resistant material" refers to a material capable of absorbing or dissipating an impact force to safeguard device functionality. This is particularly relevant for warehouse applications where moving machinery and product can result in dislodgment of the light module and/or motion sensor, including falling onto a hard floor. Accordingly, any of the housings described herein may be at least partially encased in a rubber casing. In this manner, if any of the components are inadvertently clipped, the light module or motion sensor can be placed back onto the surface while functionality is maintained.

"At least partially optically-transparent" is used broadly herein to refer to at least some light that is observable to a person looking at the light module. Accordingly, the housing may be transparent or translucent at a wavelength corresponding to the wavelength of light emitted from the optical light sources upon actuation. The housing may be optically opaque, but with regions (e.g., "windows") that permit light to pass from the optical light sources to outside the housing. In this manner, the windows are characterized as optically aligned with the optical light sources.

Example 1

This example demonstrates a warning light that can be used to alert an individual of movement around a blind corner. It is particularly useful in warehouse settings where product tends to be stacked along high shelves with a mixture of walking persons and heavy moving machinery, such as forklifts. Each time a person approaches a corner, there is a risk of collision. The devices and methods provided herein are intended to reduce risk of collision by ensuring there is appropriate warning well before collision to either the individual, machine operator, or both.

Figure 1A:
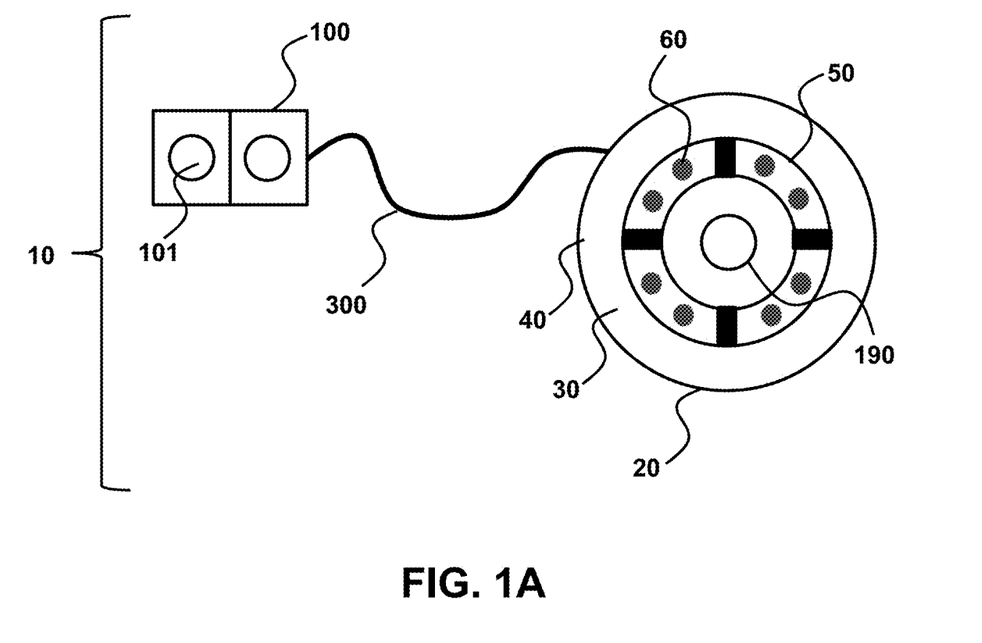
FIG. 1A is a schematic illustration of a motion-activated warning light.
Figure 1B:
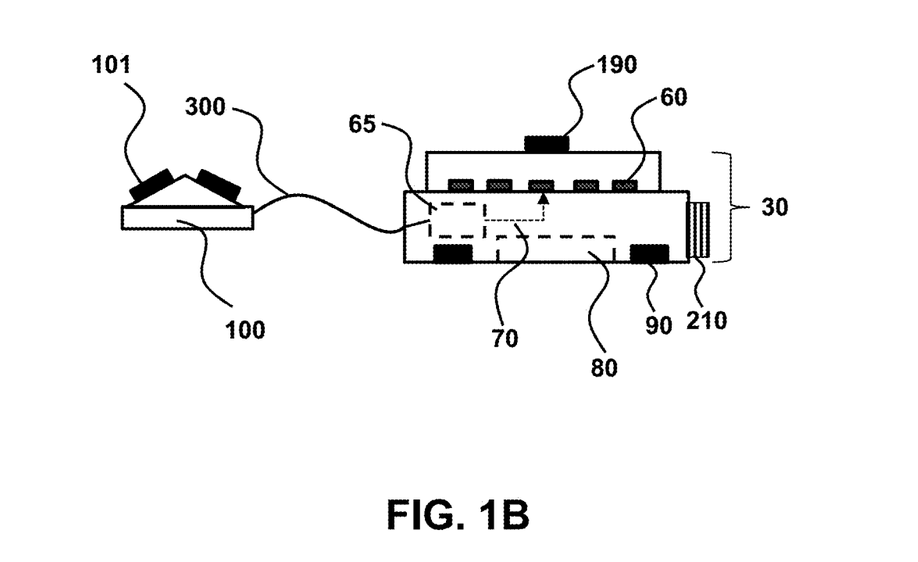
FIG. 1B is a cross-sectional view of a warning light.
Figure 2:
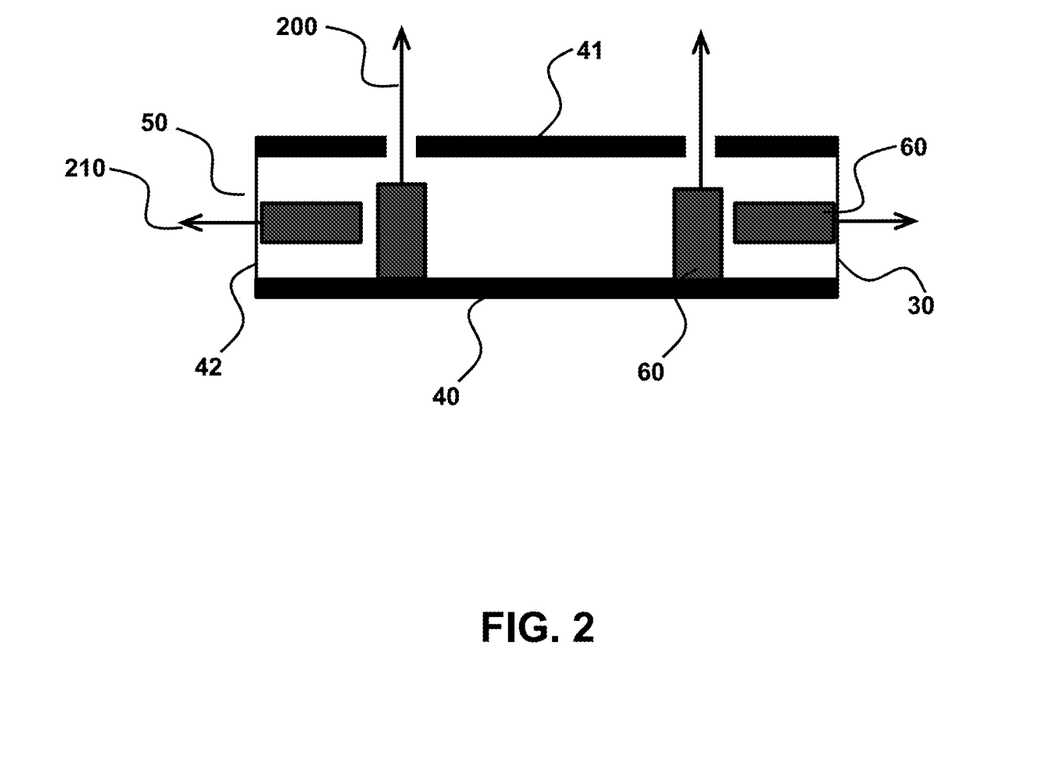
FIG. 2 is a schematic illustration of light module with optical light sources oriented to illuminate out a top and side surface of an upper portion of the light module housing, as indicated by the arrows.
Figure 3:
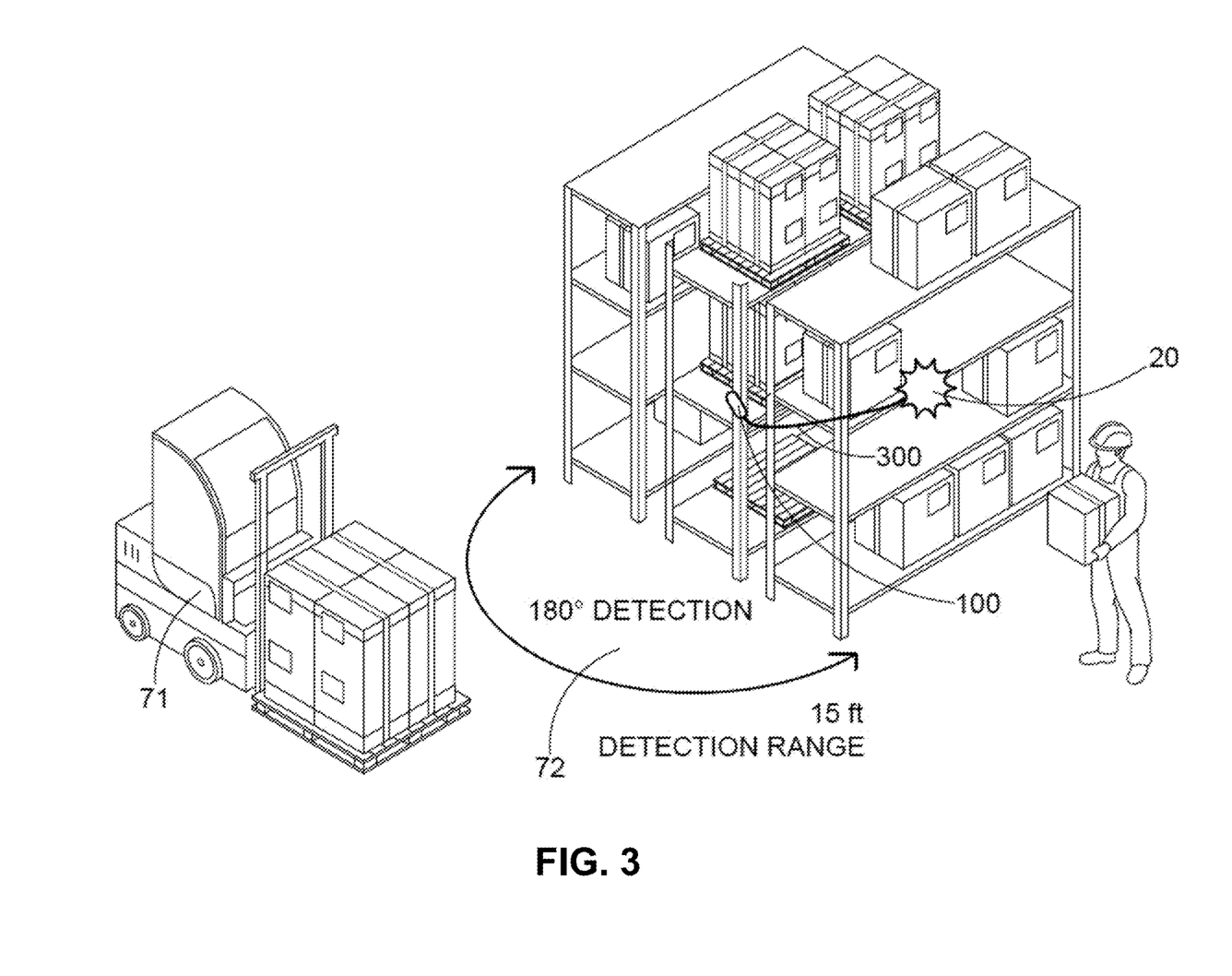
FIG. 3 illustrates a safety light in use in a warehouse to warn of collision risk around blind corners.

Referring to FIGS. 1A-1B and 2, a warning light 10 (e.g., a warehouse warning light—see FIG. 3) comprises a light module 20 having a housing 30 with a base 40 and an at least partially optically-transparent upper portion 50. For example, the housing may be formed of a material that is not optically transparent, such as an impact-resistant rubber, with windows of optically transparent portions to facilitate light transmission from an inner volume within the housing to the surrounding environment for observation by an individual. Optical light sources 60, such as LEDs or other low-energy usage light sources, are provided so that upon actuation observable light is transmitted through the upper portion 50 upon a motion-detected input 70 generated by an object 71 moving in a region of interest 72 detected by external motion sensor 100 (see FIG. 2). FIG. 2 illustrates a cylindrically shaped housing (e.g., a puck shape), and FIG. 1A-1B a more complex shape. It is preferred that the actuated light be observable in all observable directions when mounted to a surface, so that light is transmitted out of a top surface and a side surface, as indicated by arrows 200 and 210 in FIG. 2. A battery source 80 is positioned in housing 30. A fastener may be a magnet 90 is positioned within the housing 30, such as in the base 40, to facilitate magnetic connection between the LED light module and a magnetizable surface (such as shelfs or shelf supports, as shown in FIG. 3).

An external motion sensor 100 having motion sensors 101, such as passive infrared or microwave sensors, is operably connected to the LED light module 20. The connection may be by a wireless connection (e.g., blue-tooth) or a hard-wired cable connection, as illustrated by cable 300 connecting the motion sensor to the light module. For applications where simultaneous motion detection in two regions is required for light and/or audible alarm actuation, the warning light 10 may further comprise a light module motion sensor 190. In FIG. 1A-1B, this aspect is illustrated as integrated with the light module 20. Of course, the light module motion sensor may functionally correspond to a second equivalent external motion sensor 100 and be correspondingly separate from, but operably connected (wireless communication or hard-wired) to, light module 20. In this manner, light is actuated only when there is motion detected on both sides (e.g., aisles) of a blind corner, for example, including for a situation where there is a motorized warehouse vehicle on one side and a person on another side. In this manner, unwanted actuation of the light and/or audible alarm is avoided for situations where only a single motion is detected, meaning that there is no risk of imminent collision. For ease of use and increased reliability, however, in an embodiment there is no motion sensor integrated with or otherwise connected to the LED light module.

The warning light 10 may further comprise a controller 65 having electronics to convert a motion signal received from motion sensor 100 (and/or optionally sensor 200) to correspondingly control actuation or energization of light sources 60, as reflected by arrow 70 corresponding to motion detection input to LEDs 60. Controller can facilitate additional information to an individual, such as by providing flashing of lights at an actuation frequency. For example, the shorter the time to collision (e.g., the closer the detected motion is to the blind corner) can be reflected by a higher frequency of flashing. As desired, an audible alarm may be generated from an audible alarm source 210 to warn of a collision risk.

The warning lights provided herein are compatible with any type of motion sensor, so long as the motion sensor can be powered light module and can reliably detect motion up to about 5 meters or so. Examples include infrared and microwave-based sensors. Any of the motion sensors provided herein may comprise a passive infrared (PIR) sensor to detect motion. A sensor is selected depending on the desired sensitivity and detection range. Suitable detection ranges, including in a warehouse setting, is about 15 feet, or up to about 4.5 m to 5 m. By using two PIR sensors at an offset angle relative to each other, full 180° detection relative to the surface upon which the motion sensor is attached is provided. As desired, a fastener may be used to reliably connect the motion sensor 100 to a motion sensor surface, including as illustrated in FIG. 3 for a motion sensor surface that is shelving around the corner from the position of the light module 20. FIG. 3 illustrates a warehouse application where the light module 20 is connected to an external motion sensor 100 by electrical cable 100 to alert an individual of a moving object 71 such as a forklift that is in a region of interest 72 such as a blind corner. Depending on the application, the fastener may be a magnet, Velcro®, adhesive, or the like.

Figure 4:
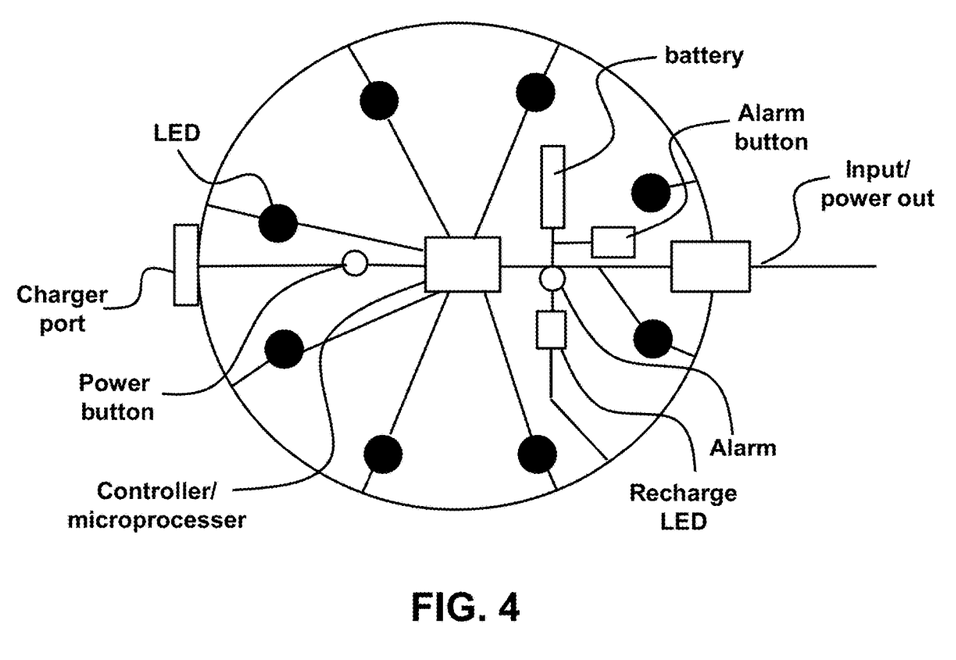
FIG. 4 is an electrical circuit schematic of a light module having eight optical light sources that are LEDs.
Figure 5:
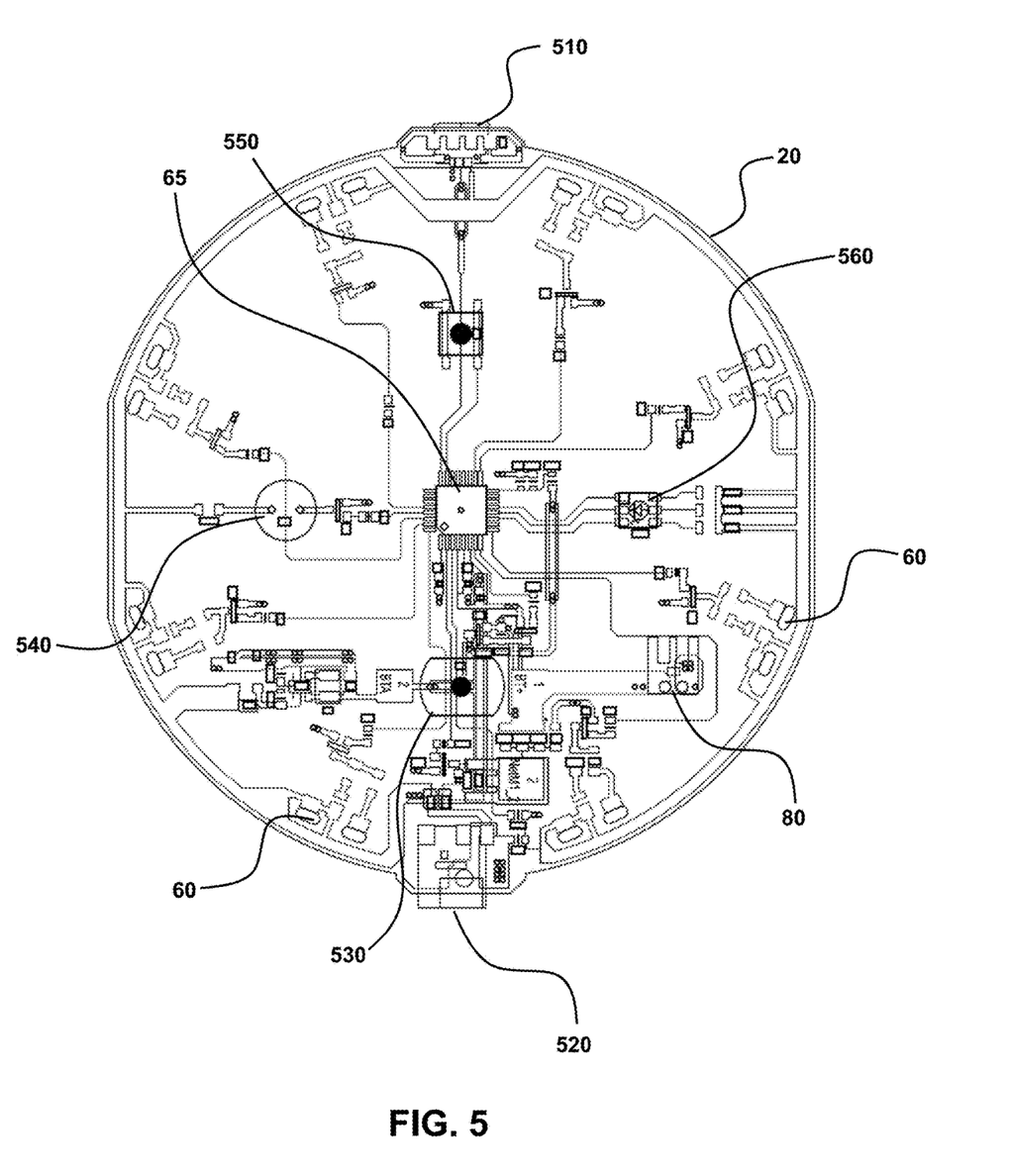
FIG. 5 is a schematic summary of the various components in a motion-activated warning light.

FIG. 4 is a schematic diagram of certain electronic components of the light module. The input signal is provided to the controller, such as a microprocessor, that ensures upon a suitable input signal, each of the optical sources (eight sources are illustrated) are actuated. Batteries power both the light module and the motion sensor (not shown). Another schematic is provided in FIG. 5 illustrating a light module with housing containing optical light sources 60, battery 80, sensor connection 510 (e.g., connection to electrical cable) for connecting the light module to an external motion sensor, a power button 530, an alarm, an alarm button 540 (e.g., for turning alarm off/on), charger connection 520, recharge LED 560 and a controller 65 (e.g., integrated circuit). The alarm may provide an audible signal warning of collision risk. In this manner, both and auditory and visual warning signals are generated. Any of the optical light sources may be LEDs that are rechargeable, including solar rechargeable.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A warning light comprising:
    a light module comprising:
        a housing having an at least partially optically-transparent upper portion;
        a plurality of motion-actuated optical light sources positioned in the housing and configured to illuminate in all hemispherical directions out of the optically-transparent upper portion upon a motion-detected input;
        a battery source positioned in the housing;
        a fastener connected to or incorporated in the housing base for connecting the light module to a light module support surface;
    an external motion sensor operably connected to the light module;
    a motion sensor fastener connected to the external motion sensor for connecting the external motion sensor to a motion sensor support surface;
    wherein:
        the external motion sensor generates a motion-detected input to actuate the optical light sources upon sensing motion; and
        the battery source in the light module supplies power to the external motion sensor.

2. The warning light of claim 1, wherein the plurality of motion-actuated optical light sources comprise light emitting diodes (LEDs) and the light module is a LED light module.

3. The warning light of claim 1, further comprising:
    a cable that electrically connects the external motion sensor to the light module, wherein the cable conveys power to the external motion sensor from the light module battery source, and electronically connects the optical light sources to the motion detected input from the external motion sensor.

4. The warning light of claim 3, wherein the cable has a length that is between 0.5 m and 3 m.

5. The warning light of claim 3, comprising a plurality of cables, wherein at least two cables are configured to interconnect with each other to increase an effective cable length.

6. The warning light of claim 2, further comprising a light module motion sensor operably connected to the motion-actuated optical light sources, wherein motion detection by both the light module motion sensor and the external motion sensor is required for LED actuation.

7. The warning light of claim 1, configured for use around blind corners in a warehouse.

8. The warning light of claim 1, further comprising a controller positioned in the housing to control optical light source actuation.

9. The warning light of claim 8, wherein the controller is configured to provide:
a constant actuation of the optical light sources for a minimum period of time that is between 10 seconds and 20 seconds; or
an actuation frequency of the optical light sources for a flashing effect.

10. The warning light of claim 1, further comprising an audible alarm source for generating an audible alarm upon motion detection by the motion sensor.

11. The warning light of claim 1, wherein the motion sensor comprises a passive infrared sensor or a microwave sensor.

12. The warning light of claim 2, wherein a first plurality of the LEDs are in a horizontal alignment direction to transmit light through a side surface of the housing; and a second plurality of LEDs are aligned in a vertical alignment direction to transmit light through a top surface of the housing.

13. The warning light of claim 1, wherein the fastener is selected from the group consisting of: a magnet, an adhesive, a hook-and-loop fastener such as Velcro®, tape and screws.

14. The warning light of claim 1, wherein the housing of the light module is at least partially formed of a shock-resistant material.

15. A method of installing a warning light to warn an individual of an approaching object in a blind corner, the method comprising the steps of:
providing the warning light of claim 1;
mounting the light module to a first surface;
mounting the external motion sensor to a second surface, wherein the first and second surfaces are visually obstructed from each other;
electronically connecting the light module to the external motion sensor;
thereby installing the warning light to warn an individual of an approaching object in a blind corner.

16. The method of claim 15, wherein the blind corner is in a warehouse, and the external motion sensor detects a moving object that is within about 15 feet of the external motion sensor.

17. The method of claim 16, wherein the moving object is a forklift, a pallet jack, a scissor lift, a picker or a second person.

18. The method of claim 15, wherein the warning light is positioned to detect oncoming traffic around corners.

19. The method of claim 15, wherein the mounting the light module step comprises magnetically attaching the light module to the first surface and the mounting the external motion sensor comprises magnetically attaching the external motion sensor to the second surface.

* * * * *